(12) United States Patent
Hsu et al.

(10) Patent No.: US 10,502,541 B2
(45) Date of Patent: Dec. 10, 2019

(54) DEVICE FOR DETECTING THICKNESS AND THICKNESS VARIATION OF A SHEETLIKE OBJECT

(71) Applicant: Climax Machine Industry Co., Ltd., New Taipei (TW)

(72) Inventors: Tien-Lu Hsu, New Taipei (TW); Chun-Yen Chen, New Taipei (TW); Guo-feng Peng, New Taipei (TW)

(73) Assignee: CLIMAX MACHINE INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/117,557

(22) Filed: Aug. 30, 2018

(65) Prior Publication Data

US 2018/0372471 A1 Dec. 27, 2018

Related U.S. Application Data

(60) Provisional application No. 15/415,411, filed on Jan. 25, 2017.

(30) Foreign Application Priority Data

Dec. 16, 2016 (TW) .............................. 105141838 A (51) Int. Cl.
*G01B 5/06* (2006.01)
*G01D 5/20* (2006.01)

(52) U.S. Cl.
CPC ............. *G01B 5/068* (2013.01); *G01D 5/202* (2013.01)

(58) Field of Classification Search
CPC ...... B65H 2511/13; G01B 7/06; G01B 7/063; G01B 7/08; G01B 7/087; G01B 7/10; G01B 7/107; G01B 11/06; G07D 7/164; G01N 2291/0237; G01N 2291/02854
USPC ................. 324/229–231, 234; 271/262, 263, 271/265.01, 265.04
See application file for complete search history.

(56) References Cited

U.S. PATENT DOCUMENTS

| | | | |
|---|---|---|---|
| 4,446,735 A | 5/1984 | Weilacher |
| 4,550,252 A | 10/1985 | Tee |
| 4,693,010 A | 9/1987 | Sills |
| 6,913,260 B2 | 7/2005 | Maier et al. |
| 7,743,523 B2 | 6/2010 | Schletti et al. |
| 7,748,274 B2 | 7/2010 | Pellaton et al. |
| 8,028,990 B2 | 10/2011 | Miyamoto |
| 8,091,889 B2 | 1/2012 | Muranaka et al. |

(Continued)

*Primary Examiner* — Steven L Yeninas
(74) *Attorney, Agent, or Firm* — Muncy, Geissler, Olds & Lowe, P.C.

(57) ABSTRACT

A device for detecting thickness and thickness variation of a sheetlike object, includes at least a first guiding component, a plurality of second guiding components, a plurality of detection units and a position sensor. An up-down displacement occurs between the first guiding component and the second guiding components while the sheetlike object passed through the first guiding component and those second guiding components. The detection units are configured relatively to second guiding components, each of the detection units further comprises a detecting block, a first elastic member, a second elastic member and a fixing member, the first elastic member and a second elastic member connect with the second guiding component via the detecting block, while the displacement occurs at the second guiding component, a sensing face to detected of the first elastic member is having a parallel displacement relative to the position sensor.

10 Claims, 9 Drawing Sheets

(56) References Cited

U.S. PATENT DOCUMENTS 8,496,246 B2    7/2013   Muranaka et al.
8,582,123 B2   11/2013   Liu
8,610,441 B2   12/2013   Dahler et al.
8,651,481 B2    2/2014   Woodford FIG. 1
(Prior Art)

DEVICE FOR DETECTING THICKNESS AND THICKNESS VARIATION OF A SHEETLIKE OBJECT

CROSS-REFERENCE TO RELATED APPLICATIONS

This application is a continuation-in-part of U.S. patent application Ser. No. 15/415,411 filed Jan. 25, 2017 and entitled "DEVICE FOR DETECTING THICKNESS AND THICKNESS VARIATION OF A SHEETLIKE OBJECT" which is hereby incorporated by reference in its entirety.

FIELD OF THE INVENTION

The present invention is related to a device for detecting thickness and thickness variation, especially related to a device for measuring the thickness or thickness variation of a sheetlike object, such as bill, paper, sheet or bank notes, bank securities, checks, stocks, paper with security signs, certificates, access cards or tickets, lotteries, and also including credit cards, bank automatic teller cards or ID cards or identification cards.

BACKGROUND OF THE INVENTION

Generally, thickness detection of banknote is a necessary function in the money detecting apparatus and the ATM apparatus, and the tapes, folded corners on the banknote can be used to identify the thickness of the banknote therefore recognize the unqualified banknote.

The most commonly used repair method of a sheet, such as paper, bank notes, etc., is to reattach a layer of material for reinforcement. For example, the broken banknotes are usually using transparent tape to paste to avoid the continuously damage. As the banknotes will go through the recovery process, so the banking equipment would spend lots of time and money developing device for identifying the accuracy of the tape on the banknotes.

The device for measuring the thickness variations caused by adhesive tapes must have a high degree of resolution to determine the thickness variations since the typical thickness of adhesive tapes is very small.

There are many methods for measuring the thickness variations caused by adhesive tapes, which can be divided into two types: non-contact type method and contact type method. In the non-contact portion, ultrasound (U.S. Pat. Nos. 4,446,735 and 7,748,274) or capacitive sensing (U.S. Pat. No. 8,028,990) are the most common methods. However, both methods are susceptible to non-banknote factors, such as mechanical high-frequency or humidity. Thus, people prefer to use the contact type method for measuring the thickness variations caused by adhesive tapes.

The contact type method can be divided into friction type and roller type. The friction type method, such as U.S. Pat. No. 8,651,481, and then using the piezoelectric element to output the signal. The roller type method can be presently the main design direction, such as U.S. Pat. Nos. 4,550,252, 4,693,010, 6,913,260, 7,743,523, 8,091,889, 8,496,246, 8,582,123, and 8,610,441. In these patents, rollers are used to contact the objects to measure the thickness variations and represent the value on the wheel displacement; the roller would generate a rotational displacement due to the limitation of external rotation axis. The different patents use different sensing elements to output the signals of thickness variations.

In the constraint condition of the rotation axis of a link mechanism, the roller type thickness variation detector would generate a rotational displacement (angular movement) in existing devices. Without adding any mechanical components, such as connecting rods, the side face, signal measuring items (such as metal plate) and the detecting components would generate a relative rotational displacement (angular displacement) and cannot generate a completely parallel or vertical displacement t. If coils type sensor is used, the detection accuracy of the displacement detector is decreased.

Figure 1:
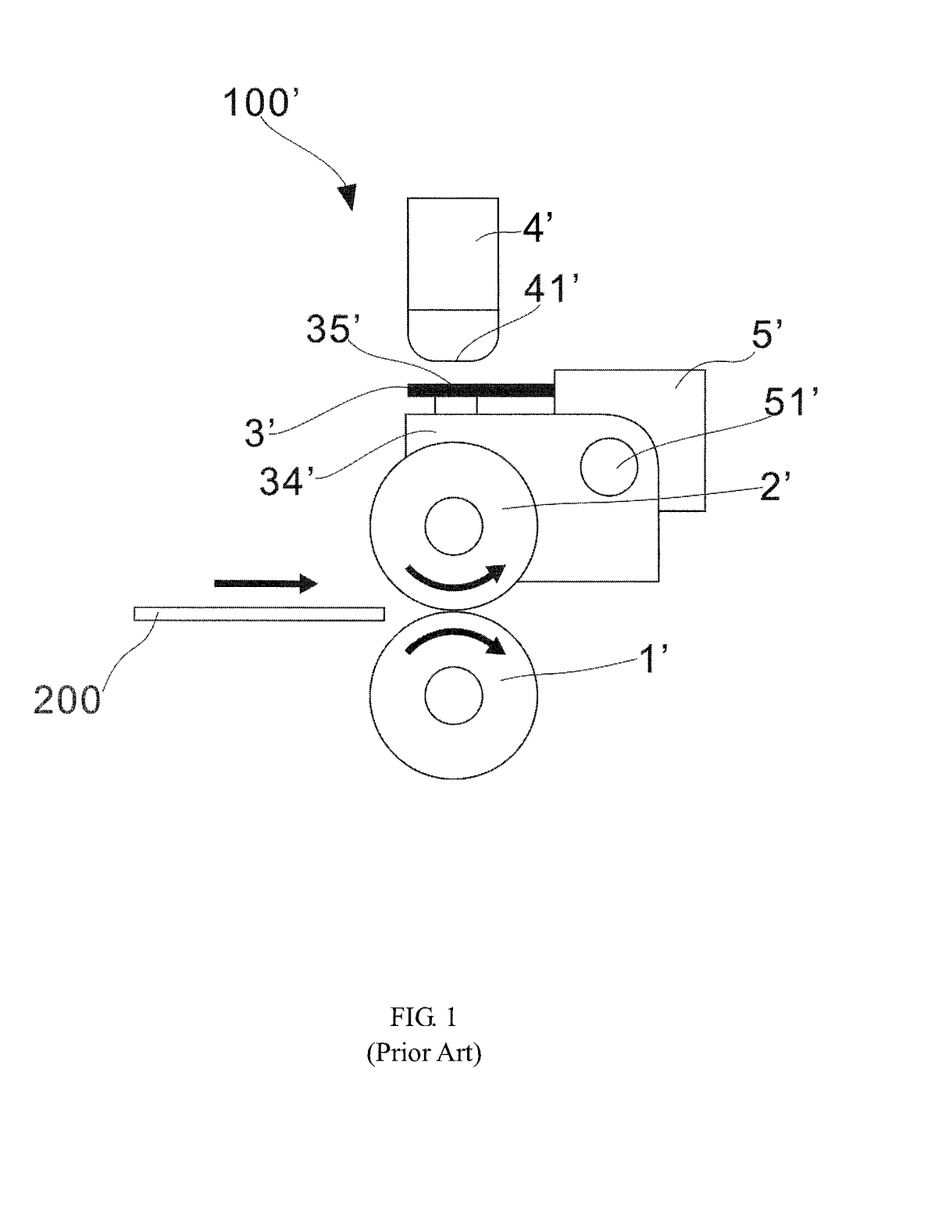
FIG. 1 is a schematic diagram showing a cross section of the device for detecting thickness and thickness variation of prior art.
Figure 2:
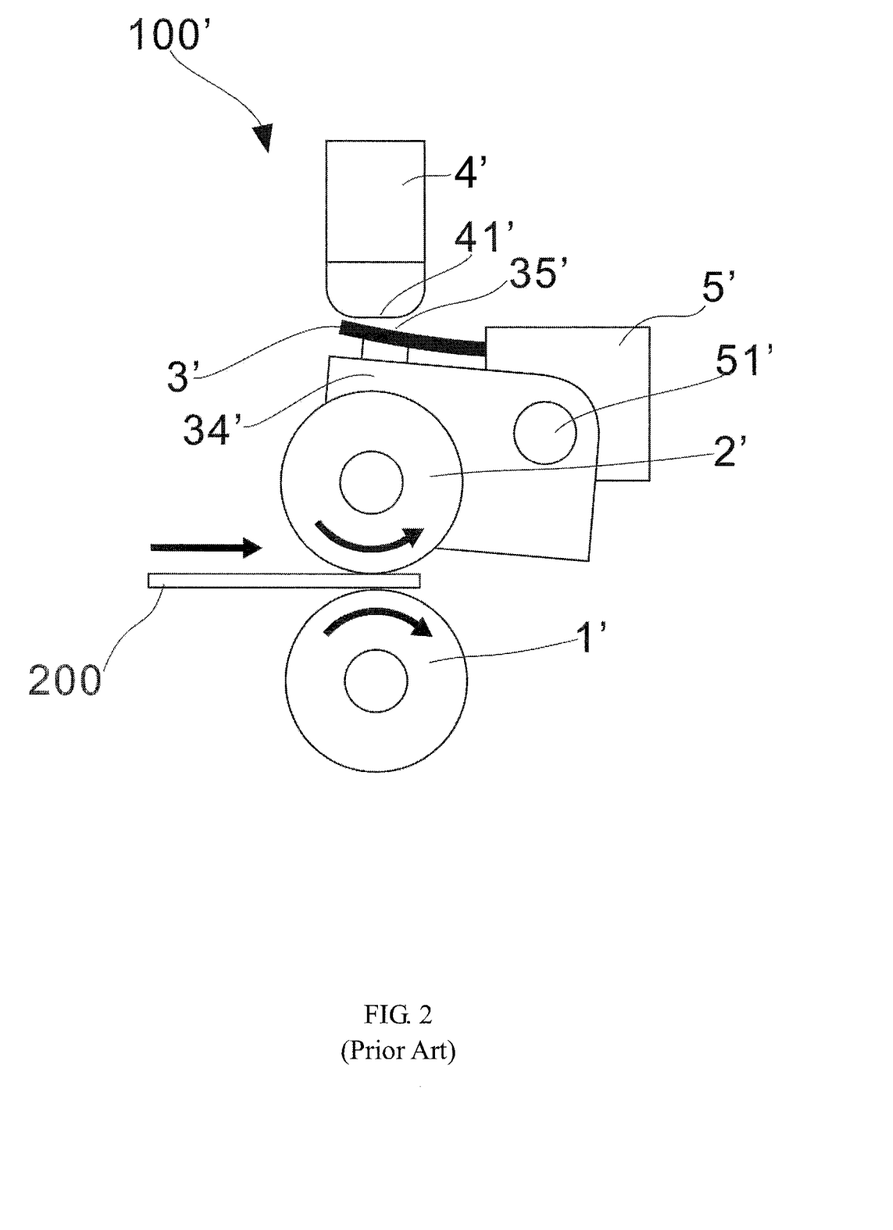
FIG. 2 is a schematic diagram showing another cross section of the device for detecting thickness and thickness variation of prior art.

For example, the device for detecting thickness and thickness variation of existing device 100' (please refer to FIG. 1 and FIG. 2, which is a schematic diagram of U.S. Pat. No. 8,496,246). which is used for detecting thickness and thickness variation of a sheetlike object 200, includes: first guiding component 1', second guiding component 2', and the sheetlike objection 200 is delivered between the first guiding component 1' and second guiding component 2', wherein the second guiding components 2' are opposite to first guiding component 1', and the second guiding components 2' are arranged in line, a deviation which is the second guiding component 2' related to the first guiding component 1' while the sheetlike object 200 passed through the first guiding component 1' and those second guiding components 2', due to the thickness variation of the sheetlike object 200'; a flat spring 3', having a sensing face 35' which connects with second elastic displacement 2' through movable fixing component 34', and the flat spring 3', the sensing face 35', movable fixing component 34' and the second guiding component 2' are connected and fixed with a stable fixing component 5' through a rotation axis 51'; when the second guiding component 2' has a deviation in relation to the first guiding component 1', the displacement of sensing face 35' occurs immediately, position sensor 4' on which sensor coil 41' is used to detect the displacement of sensing face 35'. However, the flat spring 3' generates an angle of deviation grounded on rotation axis 51' in relation to the position sensor 4', and the sensing face 35' cannot generate parallel or vertical displacement; particularly the tilt of the sensing face 35' causes a decrease in accuracy of the sensor coil 41' for detection.

In view of the above-mentioned problem, how to develop a device for improving the accuracy of displacement measurement without any angular displacement or inclined displacement is an urgent problem in relevant field.

SUMMARY OF THE INVENTION

Technical Problem to be Solved

In the constraint condition of the rotation axis of a link mechanism, the roller type thickness variation detector would detect a rotational displacement in the money detector apparatus or in an ATM apparatus. The side face, signal measuring items (such as metal plate) and the detecting components would generate a relative rotational displacement and cannot generate a completely parallel or vertical displacement, so as to decrease the detection accuracy of the displacement detector. Thus, the detection accuracy is an urgent problem in the relevant technical fields.

Technical Means to Take

The present invention provides a device for detecting thickness and thickness variation of a sheetlike object, comprises: at least a first guiding component and a plurality of second guiding components, wherein the second guiding components are opposite to first guiding component, and the second guiding components are arranged in line, an up-down displacement occurs between the first guiding component and the second guiding components while the sheetlike object passed through the first guiding component and those second guiding components, due to the thickness variation of the sheetlike object; a plurality of detection units arranged to correspond with the second guiding components, each of the detection unit comprises: a detecting block, wherein each of the second guiding components is connected with the detecting block, when the second guiding component occurs the displacement, the corresponded detecting block also occurs the displacement; a first elastic member comprising a first displacement end, wherein the first displacement end comprises a sensing face to be detected; a second elastic member comprising a second displacement end, wherein both of the first displacement end and the second displacement have a plane disposed thereto and served to connect with each side of a detecting block, so as to keep the shape of the first displacement end and the second displacement end; and a fixing member for fixing the another side of the first displacement end of the first elastic member and the another side of the second displacement end of the second elastic member; and a position sensor configured at a fixed position to detect a displacement of the sensing face, when the deviation occurs on any one of second guiding components, the relative first displacement end and second displacement end also occur the deviation, and the sensing face has a parallel displacement relative to the position sensor.

Efficacy Achievement

The present invention provides a connected guiding components through a elastic member rather than using a rotation axle to keep the shape of sensing face without bending or inclined deformation, so as that the sensing face could have a parallel displacement relative to the position sensor without any angular displacement. The rotational displacement and angular displacement of sensing face is improved, when the traditional device detects the thickness and thickness variation. The present invention provides a sensing face for parallel displacement to improve the accuracy of thickness detection and thickness variation detection, to solve the problem of the prior art.

Accordingly, the present invention accomplishes a device for detecting thickness and thickness variation over a longer period of time for design and development to solve the above problems.

DETAILED DESCRIPTION OF THE INVENTION

The following descriptive embodiments and the corresponding figures and symbols in the embodiments are illustrative description for the examiners of USPTO and the persons skilled in the art to understand the spirit of the present invention completely.

Figure 3:
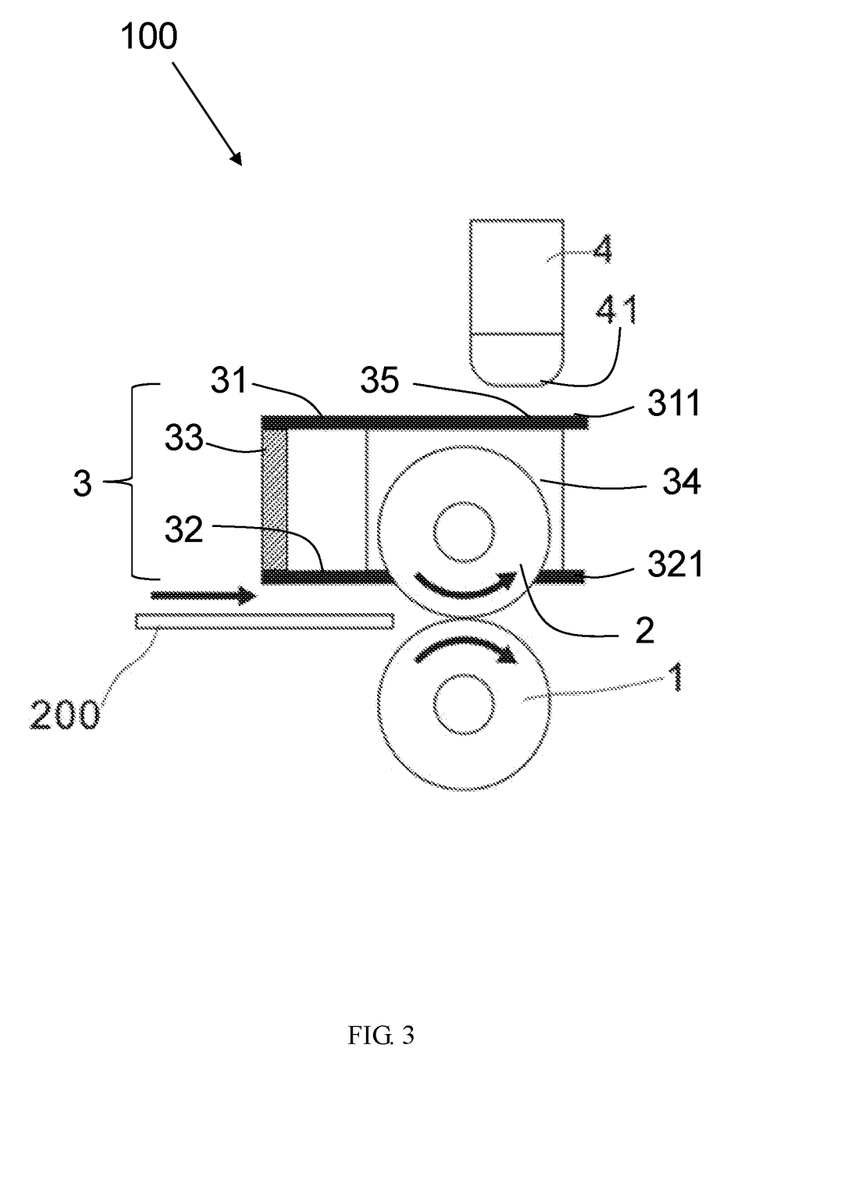
FIG. 3 is a schematic diagram showing a cross section according to the first embodiment of the present invention.
Figure 4:
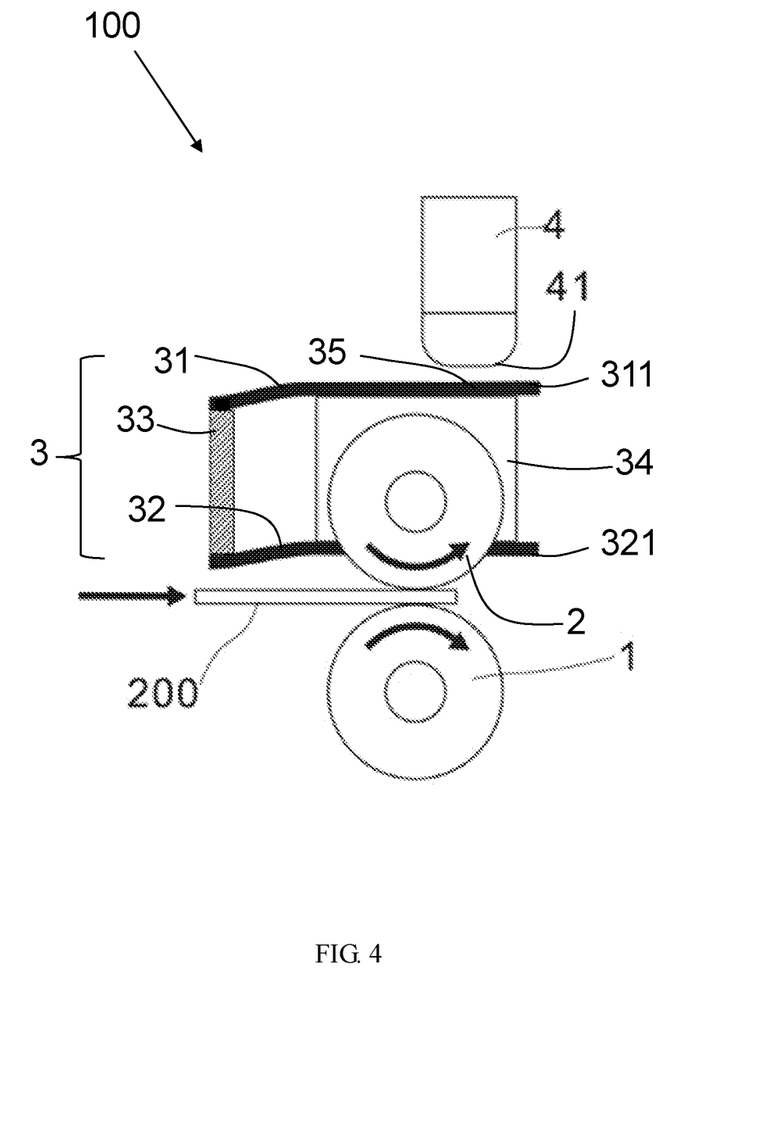
FIG. 4 is a schematic diagram showing another cross section according to the first embodiment of the present invention.

The first embodiment of the present invention is shown in FIG. 3 and FIG. 4, which shows a device 100 for detecting thickness and thickness variation of a sheetlike object 200, includes: at least a first guiding component 1, a plurality of second guiding components 2, a plurality of detection units 3, and a position sensor 4. The second guiding components 2 are opposite to first guiding component 1, and arranged in line. One or more second guiding components 2 occurs an up-down displacement relative to the first guiding component 1 while the sheetlike object 200 passed through the first guiding component 1 and second guiding components 2, due to the thickness variation of the sheetlike object 200.

The detection units 3 are configured relatively to second guiding components 2, wherein each of the detection unit 3 comprises a detecting block 34, a first elastic member 31, a second elastic member 32, and a fixing member 33. Each of second guiding components 2 is connected with the detecting block 34 respectively. When an up-down displacement occurs at anyone of the second guiding components 2, the relative detecting block 34 also occurs the up-down displacement. The first elastic member 31 comprises a first displacement end 311, wherein the first displacement end 311 has a sensing face 35; second elastic member 32 comprises a second displacement end 321, wherein the first displacement end 311 and second displacement end 321 has a plane disposed respectively and served to connect with each side of a detecting block 34, so as to keep the first displacement end 311 and the second displacement end 321 in shape, wherein the fixing member 33 is used for fixing the another end of the first elastic displacement end 311 of the first elastic member 31, and another end of the second displacement end 321 of the second elastic member 32, and connects a frame (not shown) of device 100, so as to achieve a stable structure. A position sensor 4 is configured to detect a displacement of the sensing face 35 on a fixed position. When the first displacement end 311 and the second displacement end 321 generate up-down displacement relative to the second guiding component 2, the sensing face 35 has a parallel displacement relative to the position sensor 4 (As shown in FIG. 4).

Figure 5:
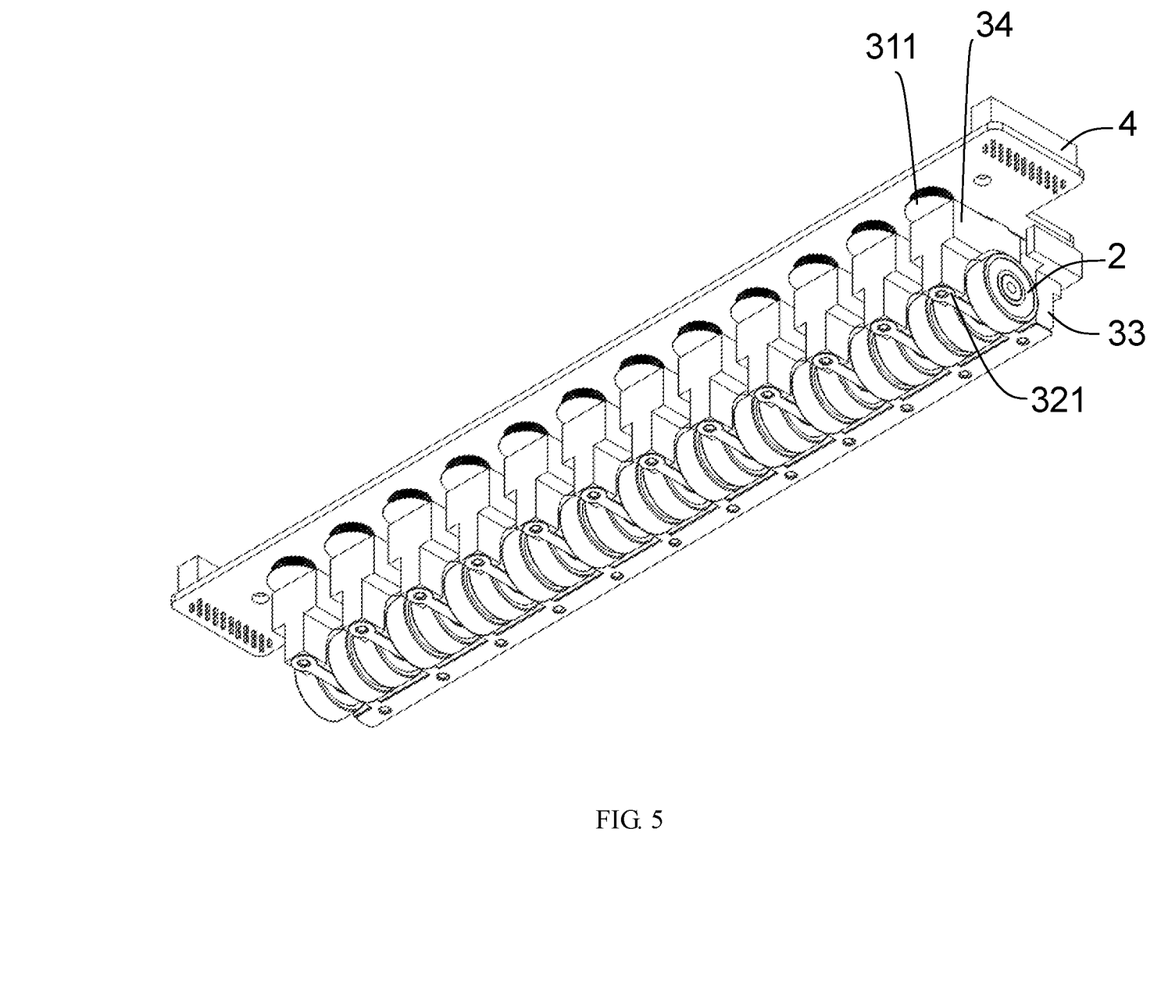
FIG. 5 shows a schematic diagram of a combination of detection units and second guiding components in first embodiment.

As shown in FIG. 5, a combination of detection units and second guiding components in first embodiment is disclosed. FIG. 5 shows twelve detection units, but the invention is not limited to the disclosed embodiments. Thus, one skilled in the art would know while the sheetlike object 200 passed through the first guiding component 1 and second guiding components 2, due to the thickness variation of the sheetlike object 200, one or more up-down displacement occurs at the second guiding component 2 in relation to the first guiding component 1. The distance of the up-down deviation is detected by position sensor 4 to evaluate the thickness of each parts of object 200.

Preferably, in the first embodiment of the present invention, the first guiding component 1 is a roller, and the second guiding components 2 are bearings, wherein the axle of the second guiding components 2 and the axle of the first guiding component 1 are parallel arranged. Therefore, the detection units and the axle of the first guiding component are parallel arranged.

Preferably, in the first embodiment of the present invention, the first elastic member 31 is made of a conductive material, and the sensing face 35 is a conductive surface.

Preferably, in the first embodiment of the present invention, the first elastic member 31 is made of metal.

Preferably, in the first embodiment of the present invention, the first displacement end 311 further comprises a material selected from the group consisting of pure metal and composite metal.

Preferably, in the first embodiment of the present invention, the position sensor 4 may be an eddy current displacement sensor, a magnetoresistive displacement sensor or other contactless displacement sensors.

Preferably, in the first embodiment of the present invention, the position sensor 4 comprises a plurality of sensor coils 41, wherein the detection units 3 are correspondingly configured with a sensor coil 41, each of sensor coils 41 is configured in relation to the sensing face 35 of the first elastic member 31 of the detection units 3. Preferably, the sensor coils 41 may be Air Coils.

Preferably, in the first embodiment of the pre sent invention, the position sensor 4 comprises an alternating current device (not shown) for inspiring the sensor coils 41 to generate alternating magnetic field.

Preferably, in the first embodiment of the present invention, device 100 for detecting thickness and thickness variation of a sheetlike object 200, further comprises a processing unit (not shown) used for calculating the effect of the sensing face 35 of first displacement end 311 on the alternating magnetic field of sensor coils 41 to obtain the displacement distance of the sensing face 35 and determine thickness and thickness variation of the sheetlike object. In this embodiment, processing unit (not shown) can be linked to sensor coils 41 directly or indirectly. The processing unit may be one or more processor, microprocessor, or other device that is capable of data processing and computing.

Preferably, in the first embodiment of the present invention, the first displacement end 311 is fixed on a side of detecting block 34 by screw-lock, and the second displacement end 321 is also fixed on another side of detecting block 34 by screw-lock. In the present invention, the displacement end can by locked by other common types of rigid connections, not limited to screw.

Preferably, in the first embodiment of the present invention, the another side of the first elastic member 31 relative to the first displacement end 311 is fixed at the fixing member 33, and the another side of the second elastic member 32 relative to the second displacement end 321 is also fixed at the fixing member 33. In the present invention, the displacement end can by locked by other common types of rigid connections, not limited to screw.

Preferably, in the first embodiment of the present invention, the sensing face 35 in alternating magnetic field of sensor coils 41 existing area is not having any other magnetic material to avoid any reduced effect on the accuracy of detection.

Figure 6:
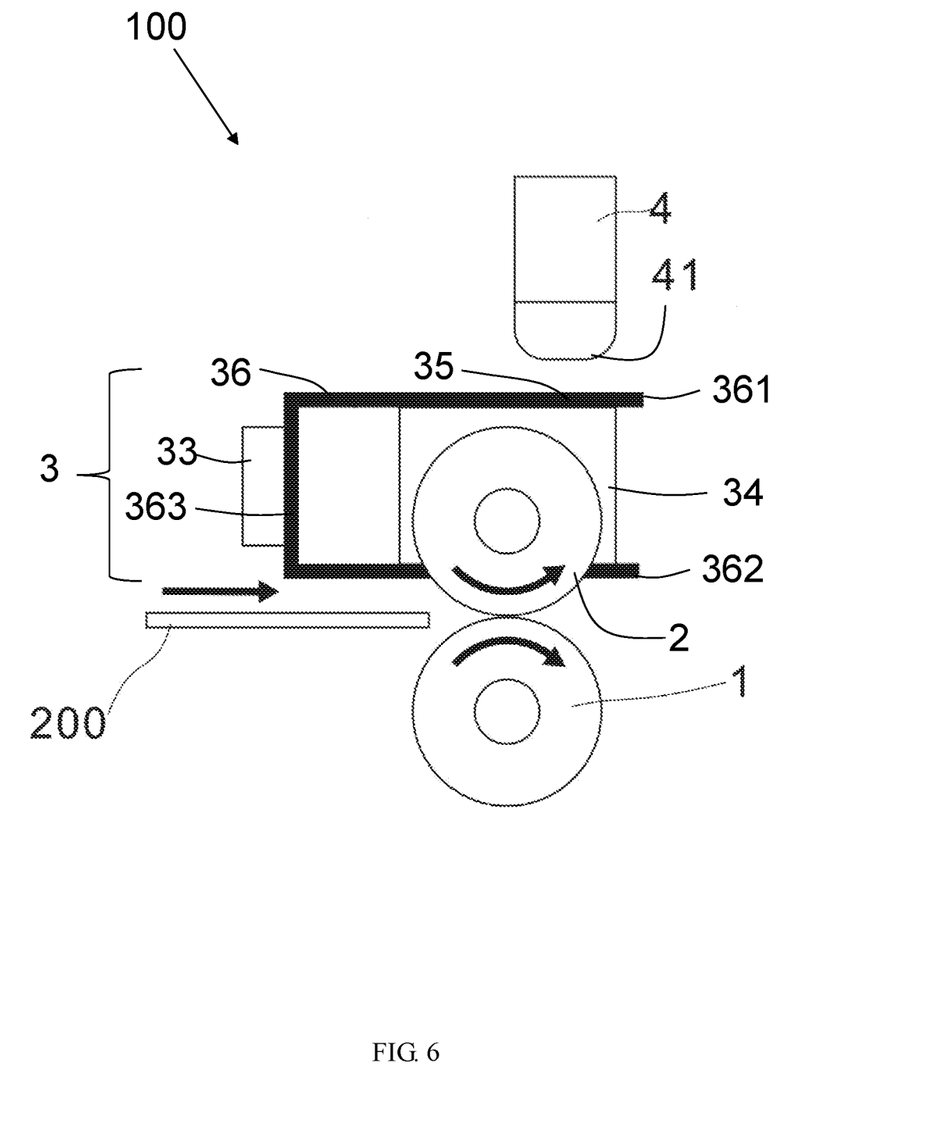
FIG. 6 is a schematic diagram showing a cross section according to second embodiment of the present invention.
Figure 7:
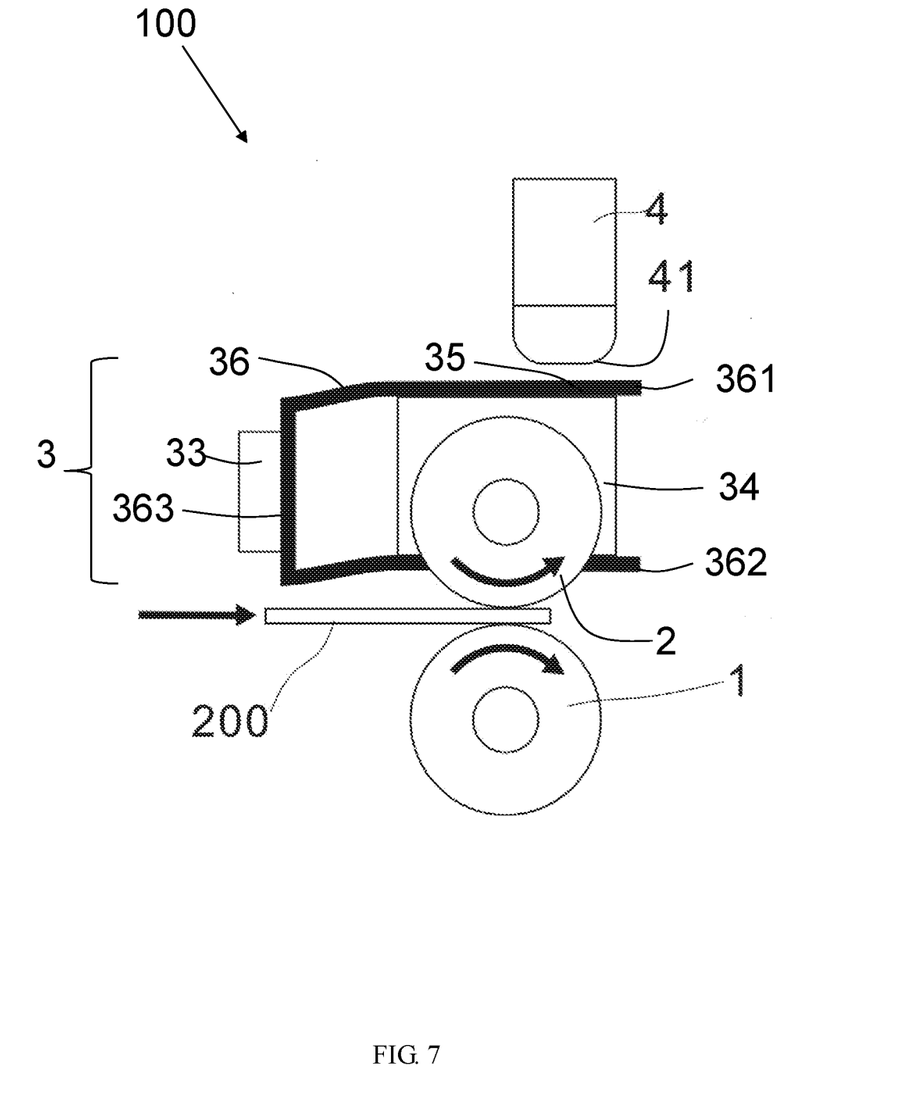
FIG. 7 is a schematic diagram showing another cross section according to second embodiment of the present invention.

As shown in FIGS. 6 and 7, the present invention provides second embodiment. A device 100 for detecting thickness and thickness variation of a sheetlike object 200, includes: at least a first guiding component 1, a plurality of second guiding components 2, a plurality of detection units 3, and a position sensor 4. The second guiding components 2 are opposite of first guiding component 1, and arranged in line. A deviation occurs on the second guiding component 2 in relation to the first guiding component 1 while the sheetlike object 200 passed through the first guiding component 1 and second guiding components 2, due to the thickness variation of the sheetlike object 200.

The detection units 3 are configured to correspond to second guiding components 2. Each of the detection unit 3 comprises: a detecting block 34, an elastic member 36, and a fixing member 33. Each of the second guiding components 2 is connected with the detecting block 34, respectively. When a displacement occurs at one of the second guiding components 2, it also occurs at the relative detecting block 34. The elastic member 36 is formed into U shape, as shown in FIG. 6, which comprises a first displacement end 361, second displacement end 362, and a fixed sector 363, wherein the first displacement end 361 has a sensing face 35 to be determined, and the first displacement end 361 and second displacement end 362 separately have a plane disposed thereto and served to connect with each side of the detecting block 34, so as to keep the form of the first displacement end 361 and second displacement end 362 in a shape. The fixing member 33 is used for fixing the fixed sector 363 of the elastic member 36, and connects a frame of device 100, so as to achieve a stable structure. The position sensor 4 is configured at a fixed position to detect a displacement of a sensing face 35. When an up-down displacement occurs at any one of the second guiding components 2, the relative first displacement end 361 and second displacement end 362 also have up-down displacement, and the sensing face 35 has a parallel displacement relative to the position sensor 4 (as shown in FIG. 7).

Preferably, in the second embodiment of the present invention, the angel between two curves of elastic member 36 may be 90°, but the present invention is not limited thereto.

Preferably, in the second embodiment of the present invention, the fixed sector 363 of the elastic member 36 is fixed at the fixing member 33 by screw-lock, but the present invention is not limited thereto. The other features of second embodiment are not repeatedly disclosed because these are similar to the first embodiment.

Figure 8:
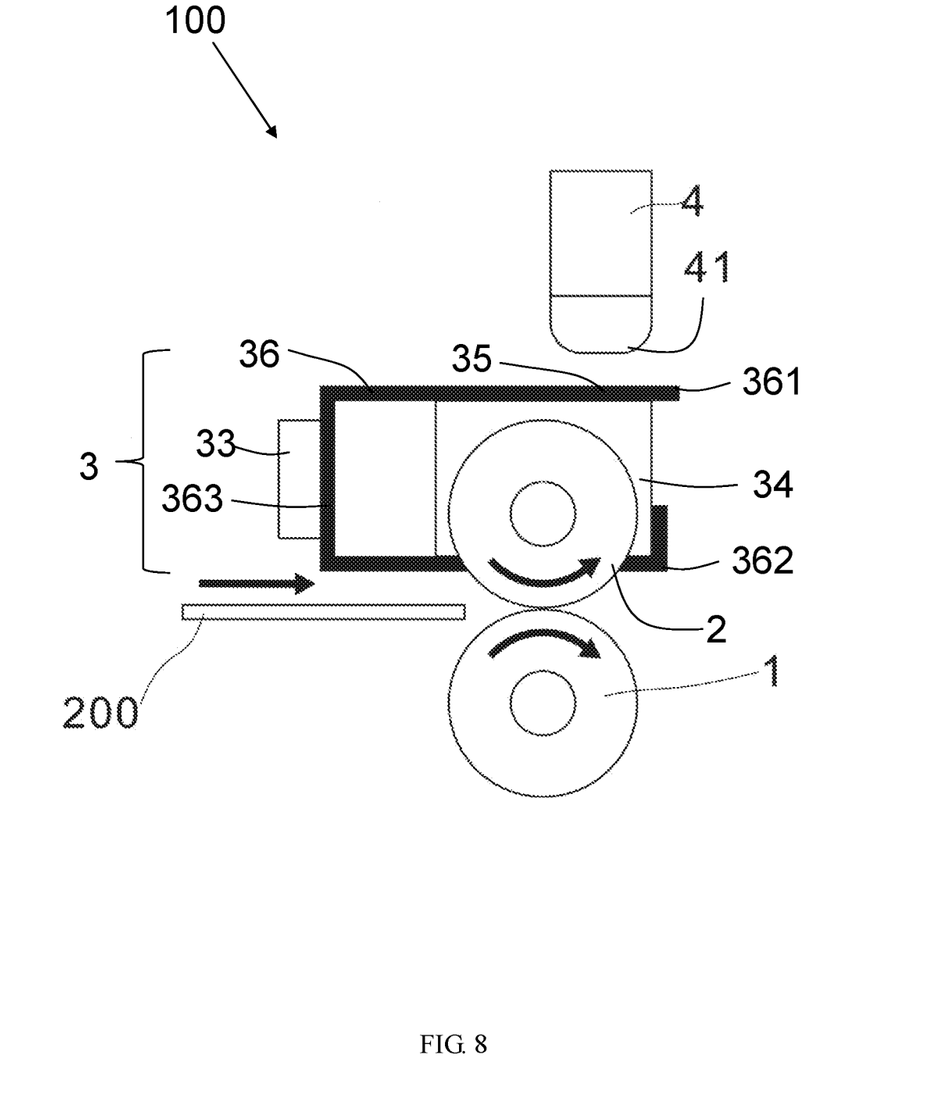
FIG. 8 is a schematic diagram showing a cross section according to third embodiment of the present invention.
Figure 9:
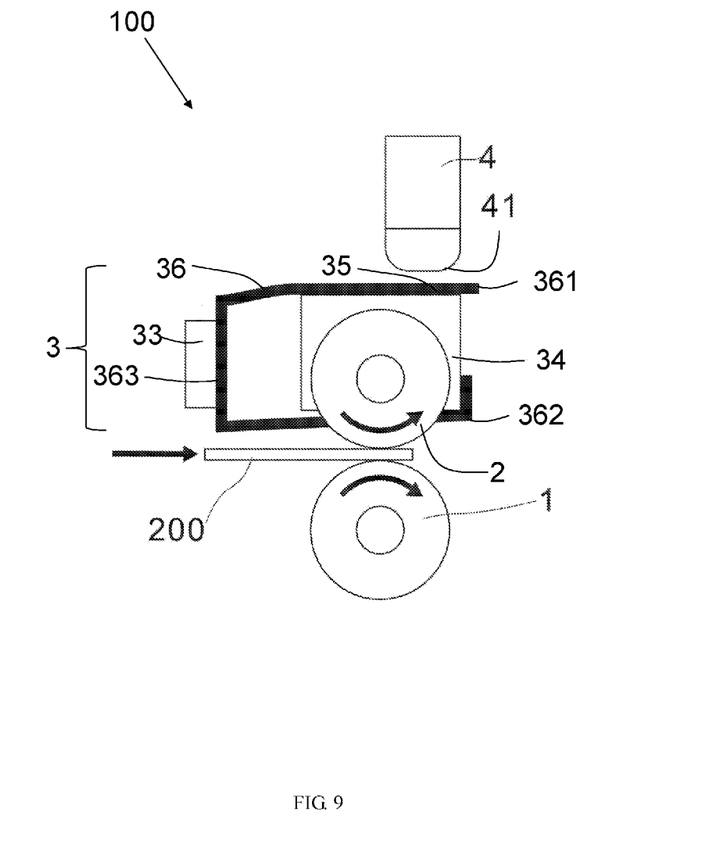
FIG. 9 is a schematic diagram showing another cross section according to third embodiment of the present invention.

As shown in FIGS. 8 and 9, the present invention provides third embodiment which is a device 100 for detecting thickness and thickness variation of a sheetlike object 200. The difference between first embodiment and second embodiment is the shape of elastic member 36. In the elastic member 36 of second embodiment, the U shape of elastic member 36 has an extension segment on one end and form three curves. The first displacement end 361 and second displacement end 362 are fixed on both vertical sides of the detecting block 34, and the extension segment of the second displacement end 362 also fixed at the detecting block 34, so as to keep the shape of the second displacement end 362 without bending or inclined deformation. When a displacement occurs on any one of second guiding components 2, the relative first displacement end 361 and second displacement end 362 also generate the upward displacement, and the sensing face 35 has a parallel displacement relative to the position sensor 4 (as shown in FIG. 9).

As mentioned above, when the device of the present invention detects thickness and thickness variation of a sheetlike object, the side face can keep a shape without bending or inclined deformation. When a displacement occurs, the sensing face has a parallel displacement relative to the position sensor, and would not generate a rotational displacement to increase the detection accuracy and solve the problems of the prior art.

Although preferred embodiments are disclosed as above, they cannot be used to limit the preset invention, and anyone skilled in the art can make some changes and modifications without exceeding the spirit and scope of the present invention, and thus the scope of the present invention will be limited only by the appended claims.

What is claimed is:

1. A device for detecting thickness and thickness variation of a sheetlike object, comprises:
    a first guiding component and a plurality of second guiding components, wherein the second guiding components are opposite to the first guiding component, and the second guiding components are arranged in line, a displacement occurs between the first guiding component and the second guiding components while the sheetlike object passes through the first guiding component and the second guiding components, due to the thickness variation of the sheetlike object;
    a plurality of detection units relatively arranged to the second guiding components, each detection unit includes:
        a detecting block connected with one of the second guiding components, when the second guiding component occurs the displacement, the corresponding detecting block also occurs the displacement;
        a first elastic member comprising a first displacement end, wherein the first displacement end comprises a sensing face to be detected;
        a second elastic member comprising a second displacement end, wherein both of the first displacement end and the second displacement end have a plane disposed thereto and connected with each side of the detecting block, so as to keep the shape of the first displacement end and the second displacement end; and
        a fixing member for fixing another side of the first displacement end of the first elastic member and another side of the second displacement end of the second elastic member; and
    a position sensor configured at a fixed position to detect a displacement of the sensing face, when the displacement occurs on any one of the second guiding components, the relative first displacement end and the relative second displacement end also occur the displacement, and the sensing face has a parallel displacement relative to the position sensor.

2. The device of claim 1, wherein the first guiding component is a roller and the second guiding components are bearings, wherein the detection units and the axle of the first guiding component are arranged in parallel.

3. The device of claim 1, wherein the first elastic member is made of a conductive material, and the sensing face is a conductive surface.

4. The device of claim 1, wherein the displacement sensor comprises a plurality of sensor coils, and each detection unit is configured with a sensor coil.

5. The device of claim 4, wherein the sensor coils are air coils.

6. The device of claim 4, wherein the position sensor comprises an alternating current device for inspiring the sensor coils to generate alternating magnetic field.

7. The device of claim 6, the device further comprises a processing unit used for calculating the effect of the sensing face of the first displacement end on the alternating magnetic field of the sensor coils.

8. The device of claim 1, wherein the first displacement end is fixed on a side of the fixing member by screws, and the second displacement end is also fixed on another side of the fixing member by screws.

9. A device for detecting thickness and thickness variation of a sheetlike object comprises:
    a first guiding component and a plurality of second guiding components, wherein the second guiding components are opposite to the first guiding component, and the second guiding components are arranged in line, a displacement occurs between the first guiding component and the second guiding components while the sheetlike object passes through the first guiding component and the second guiding components, due to the thickness variation of the sheetlike object;
    a plurality of detection units relatively arranged to the second guiding components, each detection unit includes:
    a detecting block connected with one of the second guiding components, when the second guiding component occurs the displacement, the corresponding detecting block also occurs the displacement;
    an elastic member comprising a first displacement end, a second displacement end, and a fixed sector, wherein both of the first displacement end and the second displacement end respectively has a plane connected with each side of the detecting block, so as to keep the shape of the first displacement end and the second displacement end; and
    a fixing member for fixing the fixed sector of the elastic member; and
    a position sensor configured at a fixed position to detect a displacement of the sensing face, when the displacement occurs on anyone of the second guiding components, the relative first displacement end and the relative second displacement end also occur the displacement, and the sensing face has a parallel displacement relative to the position sensor.

10. The device of claim 9, wherein the elastic member is fixed at the fixing member by screws.

* * * * *